(12) United States Patent
Weiss (10) Patent No.: US 6,914,618 B2
(45) Date of Patent: Jul. 5, 2005

(54) METHODS AND SYSTEMS FOR PRODUCING A 3-D ROTATIONAL IMAGE FROM A 2-D IMAGE

(75) Inventor: Armin Weiss, Hamburg (DE)

(73) Assignee: Sun Microsystems, Inc., Santa Clara, CA (US)

(*) Notice: Subject to any disclaimer, the term of this patent is extended or adjusted under 35 U.S.C. 154(b) by 270 days.

(21) Appl. No.: 10/053,169

(22) Filed: Nov. 2, 2001

(65) Prior Publication Data

US 2002/0140695 A1 Oct. 3, 2002

Related U.S. Application Data

(60) Provisional application No. 60/295,603, filed on Jun. 4, 2001.

(30) Foreign Application Priority Data

Nov. 2, 2000 (EP) .......................................... 00123861

(51) Int. Cl.$^7$ ............................................... G09G 5/00
(52) U.S. Cl. .......................... 345/649; 345/653; 345/419
(58) Field of Search ................................. 345/419, 420, 345/421, 422, 649–659, 629, 635–641; 382/285, 296, 305

(56) References Cited

U.S. PATENT DOCUMENTS

| | | | | |
|---|---|---|---|---|
| 5,710,875 A | * | 1/1998 | Harashima et al. | 345/419 |
| 5,848,201 A | * | 12/1998 | Kajiwara | 382/296 |
| 5,990,897 A | * | 11/1999 | Hanratty | 345/420 |
| 6,064,393 A | * | 5/2000 | Lengyel et al. | 345/419 |
| 6,104,843 A | * | 8/2000 | Nakashima | 382/305 |
| 6,417,850 B1 | * | 7/2002 | Kang | 345/422 |
| 6,597,363 B1 | * | 7/2003 | Duluk et al. | 345/506 |

FOREIGN PATENT DOCUMENTS

WO  9913433  3/1999

OTHER PUBLICATIONS

W. Robertz, et al., "A Graphical Input System for Computer–Aided Architectural Design", CAD 80. Proceedings of the 4$^{th}$ International Conference and Exhibition on Computers in Design Engineering, Brighton, UK, Mar. 1980, p. 715–723.
W. Schroeder, et al., "The Stream Polygon: a Technique for 3D Vector Field Visualization", Proceedings of the Annual Conference on Visualization, US, Los Alamitos, IEEE. Comp. Soc. Press, vol. Conf. 2, Oct. 22, 1991, p. 126–132.
Coburn and McCormick, "CorelDraw 9: The Official Guide", 1999, Osborne/McGraw–Hill, Berkeley, Chapters 12 and 18.
V. Akman, et al., "Sweeping with all Graphical Ingredients in a Topological Picturebook", Computers and Graphics, GB, Pergamon Press, Ltd., Oxford, vol. 16, No. 3, 1992, p. 273–281.
J. Wood, et al., "Visualization Over the World Wide Web and Its Application to Environmental Data", Proceedings of the Visualization Conference, US, New York, IEEE/ACM, Oct. 27, 1996, p, 81–86.

* cited by examiner

Primary Examiner—Matthew Luu
(74) Attorney, Agent, or Firm—Sonnenschein Nath & Rosenthal LLP (57) ABSTRACT

Methods, systems, and articles of manufacture consistent with the present invention produce a three-dimensional rotational image from a two-dimensional image including a plurality of objects. Each object is assigned to one of a plurality of sequential layers that correspond to visually depicted depths of the objects in the two-dimensional image. The objects are rotatively displayed to produce the three-dimensional rotational image.

25 Claims, 8 Drawing Sheets

METHODS AND SYSTEMS FOR PRODUCING A 3-D ROTATIONAL IMAGE FROM A 2-D IMAGE

CROSS REFERENCE TO RELATED APPLICATIONS

This application claims priority to the filing date of the following U.S. and foreign patent applications, both of which are incorporated herein by reference:

European Patent Application No. 00123861.7, entitled "A METHOD AND APPARATUS FOR PRODUCING A 3-D ROTATIONAL IMAGE FROM A 2-D IMAGE", filed on Nov. 2, 2000; and U.S. Provisional Patent Application Ser. No. 60/295,603, entitled "METHOD AND APPARATUS FOR PRODUCING A 3-D ROTATIONAL IMAGE FROM A 2-D IMAGE", filed on Jun. 4, 2001.

FIELD OF THE INVENTION

The present invention relates to computer generated three-dimensional images, and in particular, the invention relates to producing a three-dimensional rotational image from a two-dimensional image.

BACKGROUND OF THE INVENTION

In the context of this disclosure, unless otherwise qualified, the term "image" refers to two-dimensional arrangements of objects from any desired source and of any desired content, such as photographic or synthetic images, and also to two-dimensional areas, which represent distributions of measured values or other variables. Also, herein, two-dimensional images contain objects defined by polygons (outline edges) and by patterns, color and shading of the areas. The objects may partially overlap such that the objects are partly visible to a viewer.

Computer-based methods for converting a two-dimensional image to a three-dimensional image are known. Such a method is used, for example, in image processing systems.

One such method of generating a three-dimensional image uses rotation of the two-dimensional image around a rotation axis. This method works for single objects, as well as for multiple objects that overlap, as long as the rotation angle about the rotation axis is 360°. If the rotation angle does not equal 360°, then there is a loss of information for two-dimensional overlapping objects.

SUMMARY OF THE INVENTION

Methods, systems, and articles of manufacture consistent with the present invention provide for producing a three-dimensional rotational image from a two-dimensional image that includes a plurality of objects. This allows a computer program to represent a spatial depth (the distance from a viewer) of the objects that are included in the two-dimensional image. Objects that overlap are represented in different layers from front to rear, perpendicularly with respect to the two-dimensional image plane. The computer program sequentially orders the objects in layers according to their depth by using the depth information implicitly present in the two-dimensional image. An object that is ordered later is assigned to the layer of the object previously ordered if there is no overlap, but is assigned to a new layer if there is an overlap with the previously ordered object, or if there is an inclusion.

The computer program rotates the objects at a rotational angle about a common rotation axis, based on their layering. Objects lying further back are rotated by a smaller rotational angle, and objects lying further forward are rotated by a larger rotational angle.

This has the effect of producing an impression of the depth in the three-dimensional rotational image, while at the same time, minimizing the required number of layers. Further, a time for producing the three-dimensional rotational image is low, since the complexity of the representation merely increases linearly with the number of objects. Also, the three-dimensional rotational image has a natural look that provides a good visual impression for the viewer.

In accordance with methods consistent with the present invention, a method in a data processing system for producing a three-dimensional rotational image from a two-dimensional image including a plurality of objects is provided. The method comprises the steps of: assigning each object to one of a plurality of sequential layers that correspond to visually depicted depths of the objects in the two-dimensional image; and rotatively displaying the objects to produce the three-dimensional rotational image.

In accordance with methods consistent with the present invention, a method in a data processing system for producing a three-dimensional rotational image from a two-dimensional image including a plurality of objects is provided. The method comprises the steps of: ordering the objects in a sequence based on depths of the objects in the two-dimensional image; sequentially assigning each object in the sequence to one of a plurality of layers so that within a given layer an object assigned to that layer neither overlaps with another object in the given layer, nor is included within another object in the given layer; rotating the objects of each layer around a common rotational axis to form the three-dimensional rotational image having a maximum rotational angle around the rotational axis with each object in a first of the layers having a minimum rotational angle and objects in layers other than the first layer having a rotational angle greater than the minimum rotational angle and less than or equal to the maximum rotational angle; and displaying the three-dimensional rotational image.

In accordance with articles of manufacture consistent with the present invention, a computer-readable medium containing instructions that cause a data processing system to perform a method for producing a three-dimensional rotational image from a two-dimensional image including a plurality of objects is provided. The method comprises the steps of: assigning each object to one of a plurality of sequential layers that correspond to visually depicted depths of the objects in the two-dimensional image; and rotatively displaying the objects to produce the three-dimensional rotational image.

In accordance with articles of manufacture consistent with the present invention, a computer-readable medium containing instructions that cause a data processing system to perform a method for producing a three-dimensional rotational image from a two-dimensional image including a plurality of objects is provided. The method comprises the steps of: ordering the objects in a sequence based on depths of the objects in the two-dimensional image; sequentially assigning each object in the sequence to one of a plurality of layers so that within a given layer an object assigned to that layer neither overlaps with another object in the given layer, nor is included within another object in the given layer; rotating the objects of each layer around a common rotational axis to form the three-dimensional rotational image having a maximum rotational angle around the rotational axis with each object in a first of the layers having a minimum rotational angle and objects in layers other than the first layer having a rotational angle greater than the minimum rotational angle and less than or equal to the maximum rotational angle; and displaying the three-dimensional rotational image.

In accordance with systems consistent with the present invention, a data processing system for producing a three-dimensional rotational image from a two-dimensional image including a plurality of objects is provided. The data processing system comprises: a memory comprising a program that assigns each object to one of a plurality of sequential layers that correspond to visually depicted depths of the objects in the two-dimensional image, and rotatively displays the objects to produce the three-dimensional rotational image; and a processing unit that runs the program.

In accordance with systems consistent with the present invention, a data processing system for producing a three-dimensional rotational image from a two-dimensional image including a plurality of objects is provided. The data processing system comprises: means for assigning each object to one of a plurality of sequential layers that correspond to visually depicted depths of the objects in the two-dimensional image; and means for rotatively displaying the objects to produce the three-dimensional rotational image.

In accordance with articles of manufacture consistent with the present invention, a computer-readable memory device encoded with a data structure with entries is provided. Each entry reflects a layer associated with a visually depicted depth in a two-dimensional image including a plurality of objects, wherein a three-dimensional rotational image is produced from the two-dimensional image by a program which is encoded on the memory device and which is run by a processor in a system. Each entry comprises a storage area in which is stored one of the plurality of objects assigned to the layer by the program, wherein the program rotatively displays the objects to produce the three-dimensional image.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
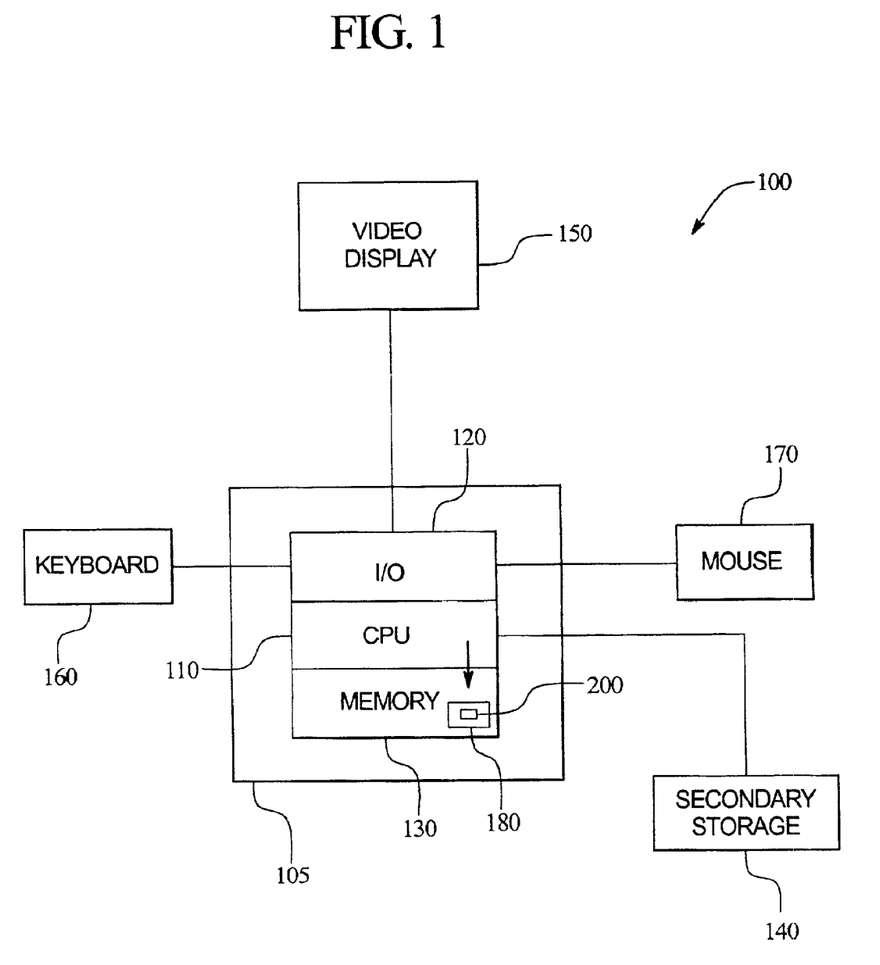
FIG. 1 depicts a block diagram of a data processing system with which embodiments of the present invention may be implemented.

FIG. 1 depicts a block diagram of a data processing system 100 suitable for practicing methods and implementing systems consistent with the present invention. The data processing system 100 comprises a central processing unit (CPU) 110, an input output I/O unit 120, a memory 130, a secondary storage device 140, and a video display 150. The data processing system 100 may further comprise standard input devices such as a keyboard 160, a mouse 170 or a speech processing means (not illustrated).

The memory 130 contains a computer program 180 for producing a three-dimensional rotational image from a two-dimensional image. Computer program 180 presents the two-dimensional image and the resultant three-dimensional rotational image on the video display 150.

The memory 130 contains various drivers and libraries (not shown) that are required for generating a three-dimensional rotational image. One of skill in the art will appreciate that the particular routines, drivers, and libraries that are used to support the methods, systems, and articles of manufacture consistent with the present invention depend, for example, on the operating system, computer programming language, and processor used to implement this invention. The routines, drivers, and libraries are known in the art and are therefore not described herein.

Figure 2:
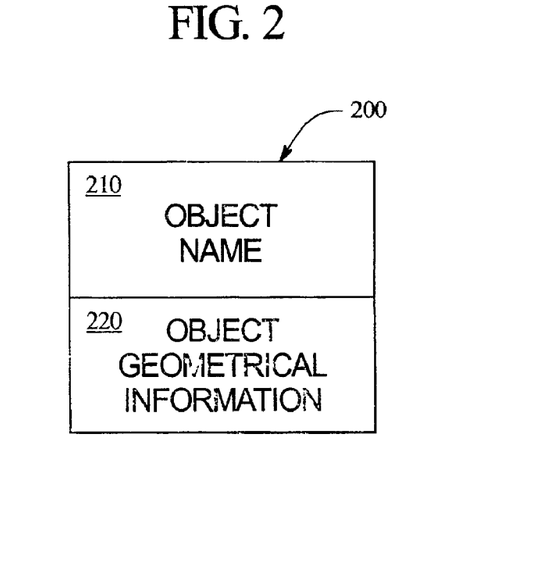
FIG. 2 depicts a block diagram of a data structure with which embodiments of the present invention may be implemented.

The computer program 180 includes a data structure 200 having entries reflecting layers of the two-dimensional image and objects of the two-dimensional image that are assigned to the layers. FIG. 2 depicts a more detailed diagram of the data structure 200. The sample data structure 200 that is depicted in FIG. 2 represents a layer. The data structure 200 comprises a name of an object 210 that corresponds to the layer and the object's geometrical information 220. The geometrical information can include, for example, position, size, and shape information.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

Figure 3:
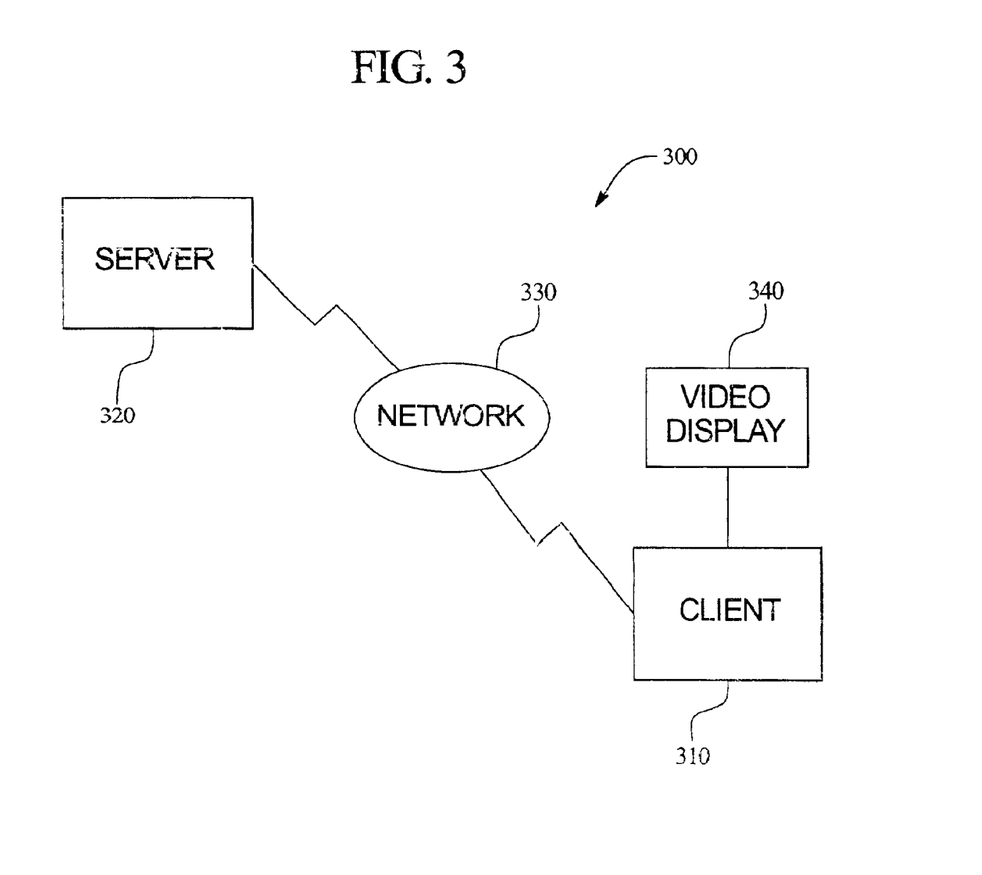
FIG. 3 depicts a block-diagram of a client-server based data processing system with which embodiments of the present invention may be implemented.

One skilled in the art will appreciate that methods, systems, and articles of manufacture consistent with the present invention may also be implemented in a client-server environment, like the one depicted in FIG. 3. FIG. 3 depicts a block diagram of a client-server based data processing system 300 with which methods, systems, and articles of manufacture consistent with the present invention may be implemented. A client computer system 310 and a server computer system 320 are each connected to a network 330, such as a Local Area Network, Wide Area Network, or the Internet. The computer program 180 can be stored on the client computer system 310 while some or all steps of the processing as described below can be carried out on the server computer system 320, which is accessed by the client computer system 310 over the network 330.

Figure 4A:
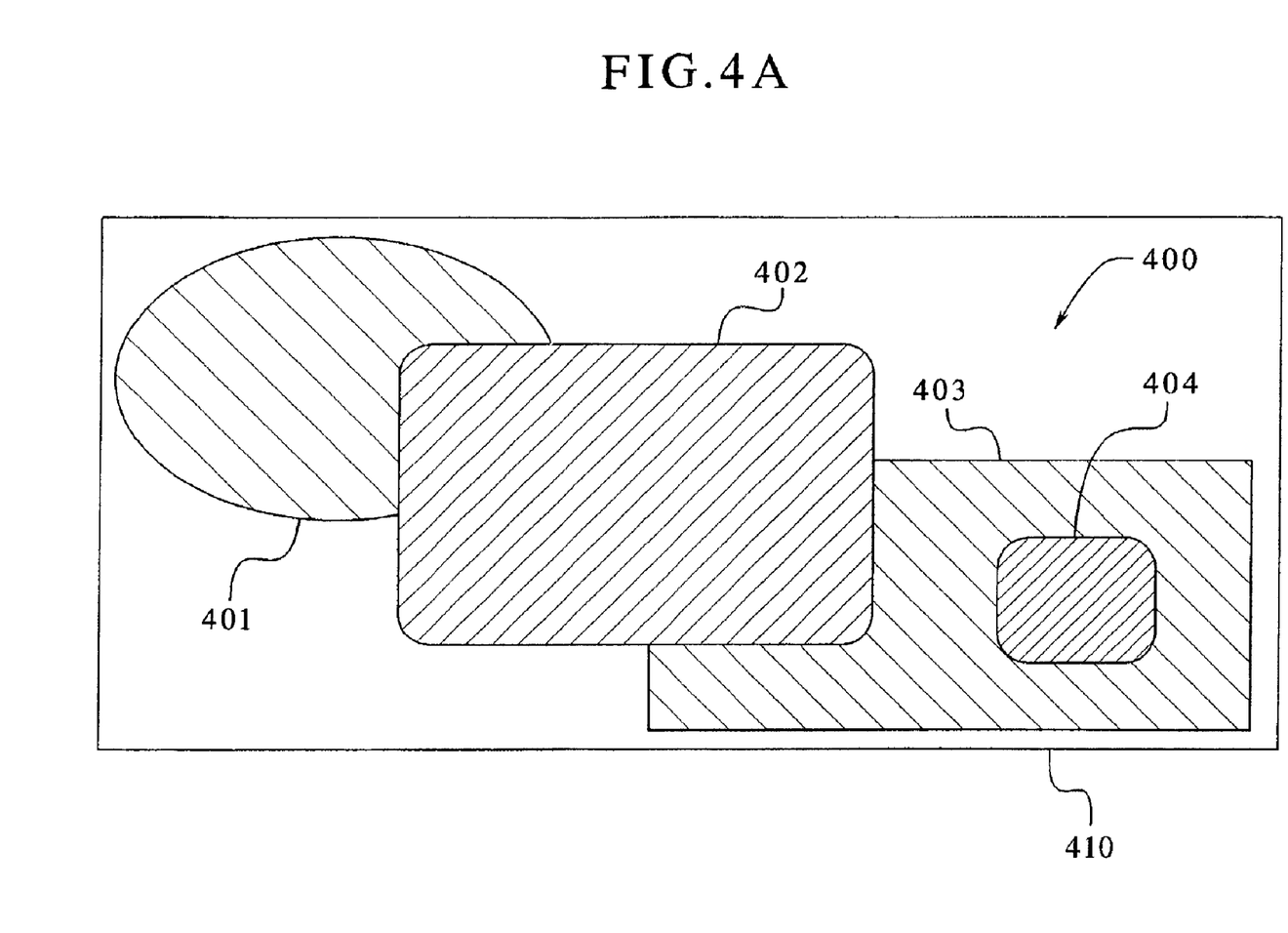
FIG. 4A depicts a block diagram of a front view of a two-dimensional image, in accordance with methods, systems, and articles of manufacture consistent with the present invention.
Figure 4B:
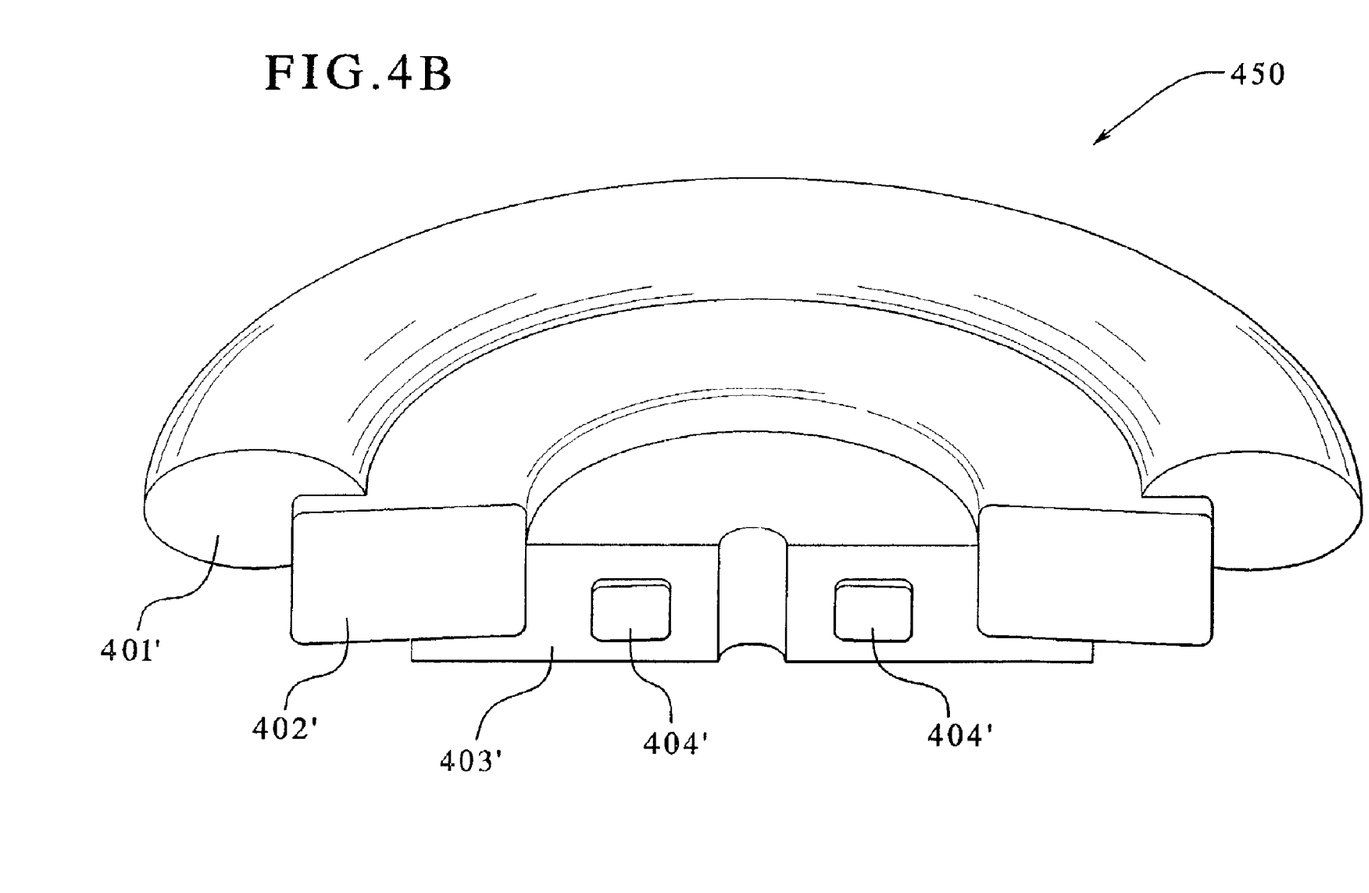
FIG. 4B depicts a perspective view of a three-dimensional rotational representation of the two-dimensional image of FIG. 4A, in accordance with methods, systems, and articles of manufacture consistent with the present invention.
Figure 4C:
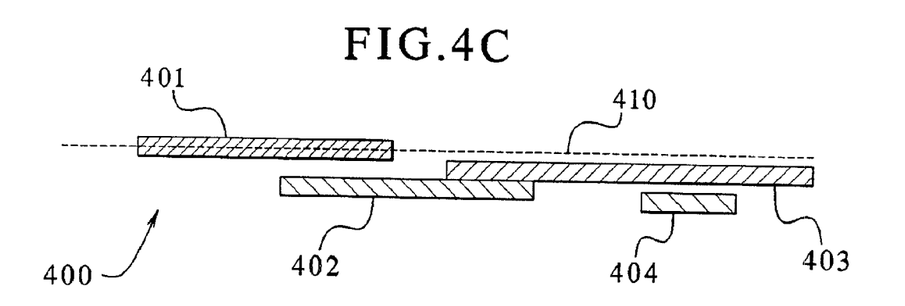
FIG. 4C depicts a representation of the objects of the two-dimensional image of FIG. 4A as ordered in layers according to their depth, in accordance with methods, systems, and articles of manufacture consistent with the present invention.
Figure 4D:
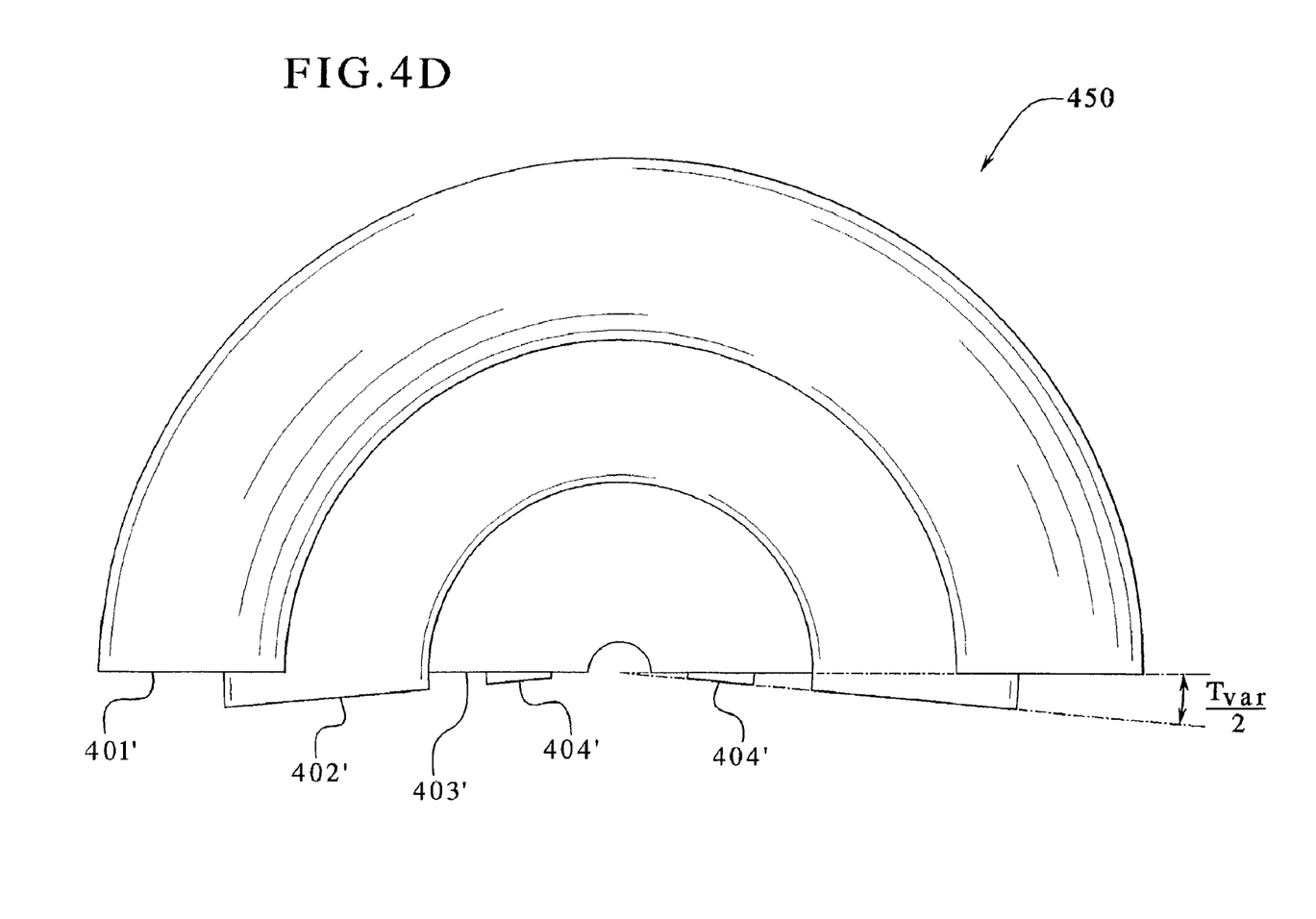
FIG. 4D depicts a top view of the three-dimensional rotational image of FIG. 4B, in accordance with methods, systems, and articles of manufacture consistent with the present invention.
Figure 5:
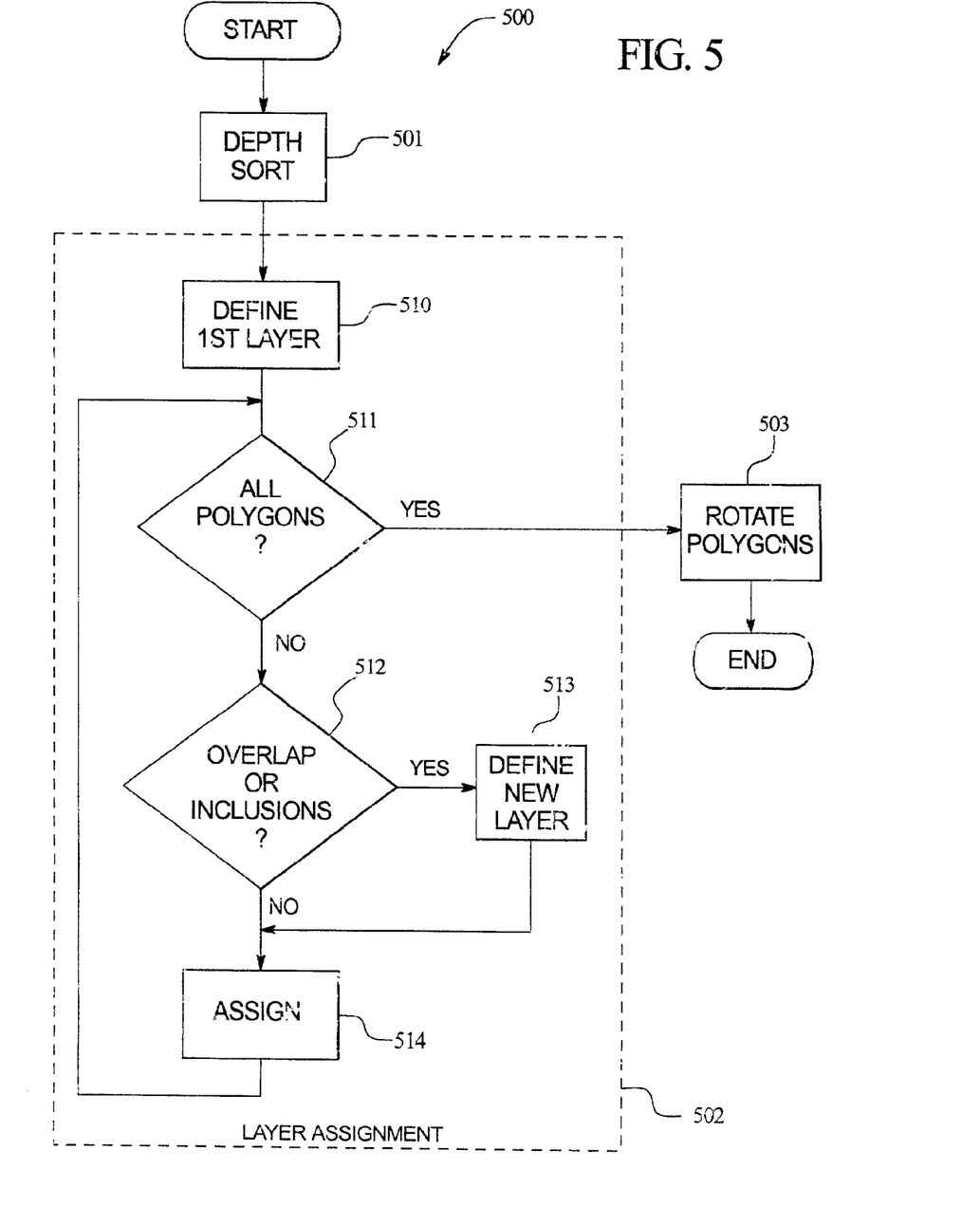
FIG. 5 depicts a flow diagram illustrating the steps of producing a three-dimensional rotational image from a two-dimensional image, in accordance with methods, systems, and articles of manufacture consistent with the present invention.

FIG. 5 depicts a flow diagram 500 illustrating exemplary steps of producing a three-dimensional rotational image from a two-dimensional image in accordance with methods, systems, and articles of manufacture consistent with the present invention. FIGS. 4A to 4D are referred to for illustration.

Referring to FIG. 4A, that figure depicts a front view of a two-dimensional image 400 comprising a plurality of objects 401, 402, 403, and 404. As illustrated, object 402 overlaps objects 401 and 403. Object 404 overlaps object 403 and is included within a boundary of object 403. Depth information is illustrated by the overlap of the objects 401, 402, 403, and 404. As will be described below with reference to the process 500 shown in FIG. 5, the depth information is obtained by the computer program to assign the objects of the two-dimensional image 400 to individual layers as shown in FIG. 4C. The computer program then generates a three-dimensional rotational image of the two-dimensional image 400 based on the assigned layers. A resultant three-dimensional rotational image 450 is depicted in a perspective view in FIG. 4B and in a top view in FIG. 4D.

While simple two-dimensional polygons are used to depict the two-dimensional objects in FIG. 4A, one of skill in the art will appreciate that the invention is not limited to such objects. The two-dimensional objects can be defined based on, for example, patterns, color, shading of areas, and texture of areas in the two-dimensional image 400.

For illustrative purposes, each object in the two-dimensional image 400 is defined by a polygon, which encloses a distinguishably represented area of the object. The representation of objects in a two-dimensional image by polygons is well known, and is therefore not further described herein. Also, the use of a specific set of polygonal objects to demonstrate the principles of the invention is illustrative, and is not intended to limit the invention to the specific set used.

Methods for storing and representing polygons in a computer memory, and determining whether polygons in a two-dimensional image overlap are well known to one of skill in the art. Accordingly, a particular method used to represent the two-dimensional polygons is not described herein. The polygons can be represented, for example, by their name, as well as, by geometrical information, such as position, size, and shape information. At runtime, this information can be stored in memory. For illustrative purposes herein, the objects are stored in memory 130 at runtime and represented by their name and geometrical information, including, for example, position, size, and shape information. This manner of storing and representing the objects is illustrative and does not limit the invention.

Referring back to FIG. 5, in the illustrated process 500, first, the computer program 180 sorts the objects of the two-dimensional image by their visually depicted depth (step 501). The computer program orders the objects in the two-dimensional image according to the depth sequence of their layering in the two-dimensional image. The object that is at the furthest depth (i.e., furthest from the viewer) is referred to as a reference polygon. A reference plane defines the plane of the reference polygon. Accordingly, the computer program generates a sequence of polygons defined by the layering of the polygons in the two-dimensional image, where a first polygon in the sequence is the reference polygon.

Referring to FIG. 4C for illustration, that figure depicts the depth layering of objects 401 to 404 as presented in FIG. 4A. As illustrated, object 401 is deepest (i.e., furthest removed from the front surface as viewed in FIG. 4A), followed by objects 403, 402, and 404, respectively. The actual relative depth is not required, but is depicted for illustrative purposes.

Referring to the illustrated example, in step 501, polygons in two-dimensional image 400 are ordered according to the sequence of their layering in two-dimensional image 400 with respect to a reference plane 410 that defines the reference polygon. Reference plane 410 is merely depicted for illustration and is not a part of the two-dimensional image 400. In the example of FIG. 4C, the reference plane 410 is at the rear of the two-dimensional image 400. Accordingly, the rearmost polygon 401 in two-dimensional image 400 is the reference polygon and, therefore, the computer program assigns polygon 401 first place in the order. The computer program also assigns polygon 403 second place, polygon 402 third place, and the front most polygon 404 in two-dimensional image 400 is assigned last place in the order.

Thus, in step 501, the computer program generates an ordered list of polygons in two-dimensional image 400 (i.e., an ordered sequence of polygons). The computer program generates the ordered list so that, if possible, a polygon is ordered next to a current polygon in a sequence for which there is no overlap between the current polygon and the next polygon in sequence. If no such non-overlapping polygon is available, then the computer program chooses one of the polygons overlapping with the current polygon that is located rearmost (based on the overlap information with other polygons). If more than one such rearmost polygons are available (e.g., if two or more groups of polygons are present, each of the groups having a rearmost polygon, but none of the polygons of one group overlap with a polygon of the other group), then the computer program arbitrarily chooses one of the rearmost polygons as next polygon. Accordingly, the computer program will then choose the other rearmost polygon of the other group to be ordered next, since it does not overlap with the one selected before.

By such an ordering, the number of necessary layers that have to be assigned (as will be described below in more detail) can be minimized. The resulting three-dimensional image will then contain the least number of different rotational angles necessary to provide a good-looking three-dimensional rotational image of the two-dimensional image.

Figure 6A:
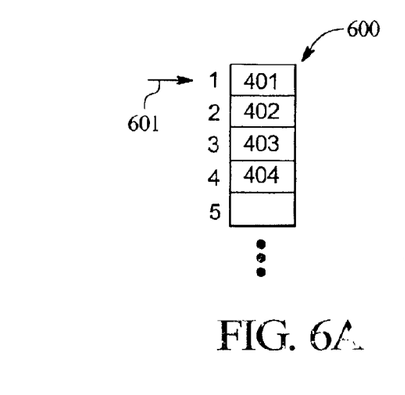
FIGS. 6A to 6E depict an ordered sequence of the objects in the two-dimensional image of FIG. 4A and an assignment of the objects to layers, in accordance with methods, systems, and articles of manufacture consistent with the present invention.

FIG. 6A depicts the reference numerals for the polygons 401, 402, 403, and 404 in an ordered list 600. Each entry in the list can comprise a name of the respective object. The list 600 is, for example, in memory 130. The list 600 is illustrative, as is the use of an ordered list, and does not limit the invention. Methods for representing ordered data in a sequence are well known to one of skill in the art. Accordingly, a particular method used to represent the ordered data is not described herein.

As discussed above, in the depth sorting operation of step 501, the computer program selects one polygon to define an initial reference (i.e., the reference polygon), and then orders the other polygons with respect to the reference polygon based upon the overlap. With respect to the illustrated example, the reference plane 410 is used to define the initial reference for the depth layering. The reference plane is used to aid in the visualization of the depth layering, however, the initial reference can be defined in different ways.

Referring back to FIG. 5, after step 501, the computer program performs a layer assignment operation (step 502). During the layer assignment operation of step 502, the computer program sequentially assigns each polygon in the ordered list that was generated in step 501, starting with the reference polygon, to one of a plurality of layers so that, within a given layer, a polygon assigned to that layer neither (i) overlaps with another polygon in the given layer, nor (ii) is included within another polygon in the given layer.

Step 502 is described in more detail as follows. The computer program first defines the first layer in the three-dimensional rotational image and, based on a current polygon pointer that initially points to the first polygon in the ordered list of polygons (i.e., ordered sequence), assigns the first polygon in the ordered list of polygons to the first layer (i.e., to a reference layer) (step 510). The computer program then advances the current polygon pointer to the second polygon in the ordered list of polygons. Also, the computer program sets a current layer pointer to the first layer. As used herein, the current layer refers to a layer addressed by the current layer pointer.

Once the first layer has been defined and the current polygon and current layer pointer have been set in step 502, then the computer program determines whether all the polygons in the ordered list have been processed (step 511).

If the computer program determines that not all of the polygons in the ordered list have been processed in step 511, then the computer program determines whether the current polygon (i.e., the polygon in the ordered list of polygons addressed by the current polygon pointer) overlaps any polygons in the two-dimensional image that are assigned to the current layer (step 512). An overlap can be either a partial overlap, or a total overlap where one polygon lies completely in front of another polygon. The computer program also determines whether there is a complete enclosing of a polygon within another polygon, which is referred to herein as an inclusion.

If the computer program determines that the current polygon overlaps or includes another polygon in step 512, then the computer program defines a new layer (step 513). In step 513, the computer program generates a new layer, and changes the current layer pointer to address the new layer so that the new layer becomes the current layer.

If the computer program determines that the current polygon does not overlap or include another polygon in step 512 or after the computer program defines a new layer in step 513, then the computer program assigns the current polygon to the current layer, and advances the current polygon pointer to the next polygon in the ordered list of polygons (step 514). After step 514, the computer program returns to step 511.

Steps 511, 512, 513, and 514 are repeated until all polygons in the ordered list of polygons are assigned to a layer. If the computer program determines that all the polygons in the ordered list have been processed in step 511, then the assignment of layers in step 502 is complete.

The assignment of layers in step 502 will now be explained in more detail in connection with FIGS. 6A to 6E, using the two-dimensional image 400 of FIG. 4A as an example. The computer program generates ordered list 600 of polygons in step 501, as discussed above, and then based on ordered list 600 starts to assign layers to the polygons in ordered list 600. In step 502, the computer program sequentially assigns layers to the polygons in ordered list 600. The assigning of the layers to the polygons in ordered list 600 is sequentially performed for individual polygons, one after another, where a polygon for which an assignment is currently to be performed is addressed by a current polygon pointer 601 as shown in FIGS. 6A to 6E.

Figure 6B:
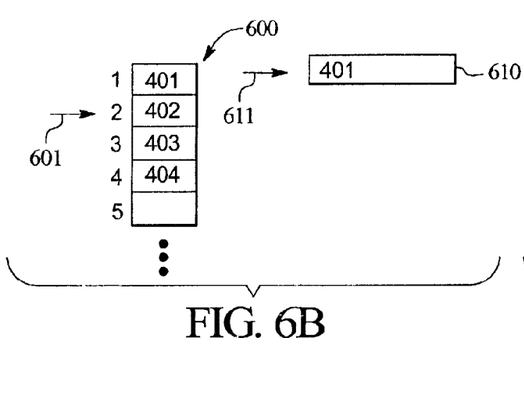
Figure 6C:
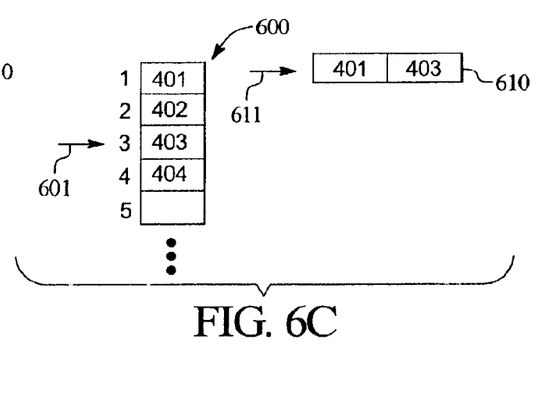
Figure 6D:
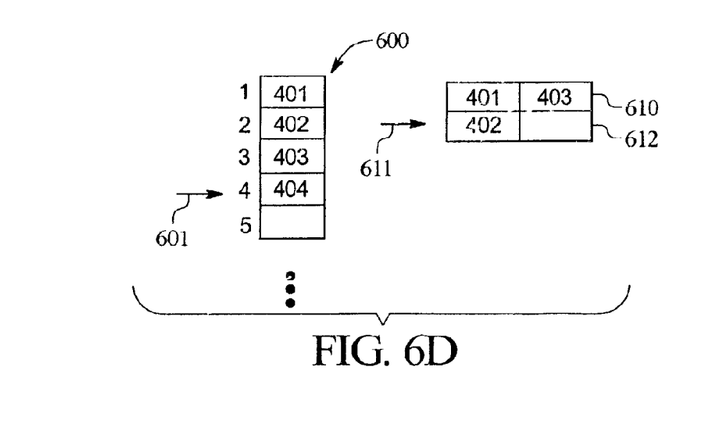

The ordered list 600 resulting from step 501 is shown in FIG. 6A. A current polygon pointer 601 addresses a first polygon in ordered list 600 as shown in FIG. 6A. In step 510, the computer program assigns polygon 401, which is stored in a location in ordered list 600 that is addressed by current polygon pointer 601, to first layer 610. This operation is illustrated in FIG. 6B as storing reference numeral 401 in a location in memory for first layer 610, which is addressed by a current layer pointer 611. Current layer pointer 311 is a pointer which addresses a memory location corresponding to a certain layer. While in step 510, the computer program advances current polygon pointer 601 to address the next location in ordered list 600, which in the illustrated example is location two that stores polygon reference numeral 403.

Then, in step 511, the computer program determines that current polygon pointer 601 identifies a valid polygon, which means that there still is a polygon in ordered list 600 that needs to be assigned to a layer. Therefore, in step 512, the computer program determines whether there is an overlap or an inclusion. Methods for determining whether one polygon overlaps or is included within another are known to those of skill in the art, and therefore a particular method for determining overlap or inclusion is not described herein. As shown in FIG. 4A, polygon 403 does not overlap polygon 401, which is the only polygon assigned to first layer 610 at this time. Therefore, polygon 403 is considered to be located in the first layer 610, and the computer program then executes step 514.

In step 514, the computer program assigns polygon 403 to layer 610, which is addressed by current layer pointer 611 (FIG. 3C). In step 514, the computer program then advances current polygon pointer 601 to address the next location in ordered list 600, which in the illustrated example is location three that stores polygon reference numeral 402.

The computer program then returns to step 511. In step 511, the computer program determines that current polygon pointer 601 identifies a valid polygon 402, which needs to be assigned to a layer, and therefore the computer program executes step 512. As shown in FIG. 4A, polygon 402 overlaps polygons 401 and 403, which are assigned to first layer 610. Therefore, polygon 403 is not in first layer 610, and the computer program executes step 513 to define a new layer.

In step 513, the computer program generates a new layer 612, and changes current layer pointer 611 to address new layer 612, so that layer 612 becomes the current layer.

Then, in step 514, the computer program assigns polygon 403 to layer 612, which is addressed by current layer pointer 611 (FIG. 3D). In step 514, the computer program also advances current polygon pointer 601 to address the next location in ordered list 600, which in the illustrated example is location four that stores polygon reference numeral 404.

The computer program then returns to step 511. In step 511, the computer program determines that current polygon pointer 601 identifies a valid polygon 404, which needs to be assigned to a layer, and therefore executes step 512 to check the current layer.

As shown in FIG. 4A, polygon 404 does not overlap polygon 402, which is assigned to current second layer 612. Therefore, polygon 404 is located in second layer 612, and the computer program executes step 514 to assign the layer.

Figure 6E:
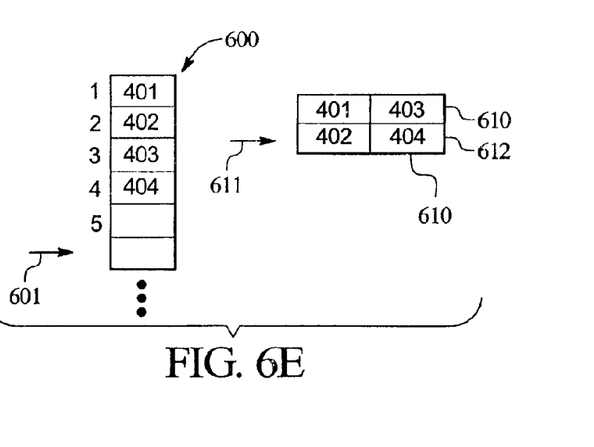

In step 514, the computer program assigns polygon 404 to layer 612, which is addressed by current layer pointer 611 (FIG. 6E). In step 514, the computer program then advances current polygon pointer 601 to address the next location in ordered list 600, which in the illustrated example is location five that does not store a polygon reference numeral.

Then, in step 511, the computer program determines that current polygon pointer 601 does not identify a valid polygon because there is no remaining polygon that needs to be assigned to a layer. Accordingly, step 502 is complete, and the computer program next executes step 503 to rotate the polygons, which will be described below.

In summary, steps 501 and 502 are associated with a series of advantages. The polygons are ordered in layers according to their depth by taking over of the depth information implicitly present in the two-dimensional image. A polygon handled later is assigned to the layer of the polygon previously considered if there is no overlap but is assigned to a new layer if there is an overlap or an inclusion with the polygon previously considered. This has the effect of producing an impression of the depth in the three-dimensional rotational image, while at the same time, minimizing the required number of layers. This reduces the running time of the process 500, since the complexity of the process 500 increases linearly with the number of objects. Moreover, a representation with a natural look is achieved.

After the computer program completes the assignment of the layers in step 502, the computer program then rotates the polygons and displays the resulting three-dimensional rotational image on a video display (step 503). In step 503, the computer program rotates the polygons of each layer about a common axis to form a three-dimensional image having a maximum rotational angle, with each polygon in the reference layer having a minimum rotational angle and polygons in layers other than the reference layer having a rotational angle greater than the minimum rotational angle and less than or equal to the maximum rotational angle. Step 503 will be described in more detail below.

FIG. 4B illustrates the result of step 503 in a perspective view. FIG. 4D shows the same result in a top view. Object 401' in the three-dimensional rotational image 450 corresponds to object 401 in the two-dimensional image. Similarly object 402' corresponds to object 402, object 403' corresponds to object 403, and object 404' corresponds to object 404. FIG. 4B and FIG. 4D illustrate that the method 500 provides a three-dimensional rotational image 450 that maintains the depth information of the two-dimensional image 400. The objects, which appear more in front (i.e., closer to the viewer) in the two-dimensional image 400, are rotated by a larger rotational angle and therefore are "sticking out" in the rotational image 450.

Referring back to FIG. 5, in step 503, the computer program rotates the polygons of each layer to form a three-dimensional rotational image in such a way that each polygon is given a rotational angle that is between a minimum rotational angle (Tmin) and a maximum rotational angle (Tmax) according to their layering. The polygons that are assigned to a reference layer are rotated by rotational angle Tmin, and the polygons that are assigned to layers other than the reference layer are additionally rotated by variable rotational angle Tvar up to a maximum variable rotational angle (Tvar max_n). Corresponding to the ordering of the layers in depth, Tvar increases from zero (for the polygons in the reference layer) up to Tvar max_n for the polygons of the layer that is most distant from the reference layer. The value of Tvar for the polygons assigned to a certain layer therefore corresponds to and reflects the (depth) location of this layer within the whole set of layers.

It is noted that the position of a layer within the ordered set of layers does not necessarily correspond to the time at which the layer has been generated. It may well be possible, however, that there is a predefined reservoir of layers to which the polygons are then assigned such that no overlap or inclusion exists for the polygons assigned to a single layer. In such a case, in step 513 of FIG. 5, instead of actually generating a new layer, the computer program would select a new layer for assigning the current polygon to. It is noted that independent of the time or the way the layers are generated, which may vary, the polygons which have been ordered sequentially, in step 501, are then assigned to one or more layers, in step 514, such that a layer does not contain polygons that overlap or have an inclusion. According to the ordering of the layers, then, the computer program rotates the polygons of the individual layers by a rotational angle between Tmin and Tmax.

The computer program divides the maximum rotational angle (Tmax) in a predetermined ratio between the minimum rotational angle (Tmin) and the maximum variable rotational angle (Tvar max_n) for the polygons of the layer located most distantly from the reference layer in terms of its depth order.

Hence, a maximum rotational angle Tmax for the overall three-dimensional image is defined. The computer program divides the maximum rotational angle Tmax in a certain ratio between a minimum rotational angle Tmin and a maximum variable rotational angle Tvar_max_n, which is described in more detail below, where Tmax=Tmin+Tvar_max_n. Specifically, a rotational thickness ratio Tthick is defined as:

Tthick=Tmin/Tvar_max_n.

Values of rotational thickness ratio Tthick in the range of 80 to 20 have been found to be favorable, while values in the range of 40 to 60 or values in the range of 5 to 95 may also be used. The computer program can receive an input from the user that selects the desired ratio. The ratio represents a compromise between a minimum variable content to avoid false representations in conjunction with z-buffer methods and a maximum variable content to avoid reducing the overall rotational angle. Z-buffer methods, which are common in image processing, use the assignment of a z-value coding for the depth location of a pixel (the location in z-direction) to each individual pixel of a two-dimensional image. Depth impression such as the covering of an object located more rearwards by an object located more in front can be generated using such z-buffer methods by judging, based on the z-buffer values, which object is located more rearwards and which one is located more in front. Since this typically involves a limited accuracy (z-buffers typically are hardware supported and therefore have integer accuracy) it may happen that two-dimensional objects due to rounding errors or due to other problems resulting from the limited accuracy of z-buffer methods may have the same z-buffer values, thereby making a depth judgement impossible. In such cases there arises an undefined state since it cannot be determined which object should be displayed in front and which one behind, thereby leading to a false three-dimensional rotational image. This problem becomes less severe if Tvar__max__n increases (which means if Tthick decreases) since then there is a larger difference in rotational angle between the polygons of different layers, thereby avoiding the likelihood of false representations arising from the limited accuracy of z-buffer methods.

On the other hand, a too large value of Tvar__max__n (and consequently a too small value of Tthick) may lead to a three-dimensional rotational image in which the depth representation is too excessive, which may give an undesirable or unfavorable visual impression.

Hence, if the three-dimensional rotational image includes four layers, a first layer has rotational angle Tmin, a fourth layer has rotational angle Tmax, a second layer has a rotational angle T2, and a third layer has a rotational angle T3, where the rotational angles are such that:

Tmin<T2<T3<Tmax, where

T2=(Tmin+Tvar__2),

T3=(T2+Tvar__3),

Tmax=(T3+Tvar__4)=Tmin+Tvar__max__n.

When multiple layers are rotated in step 503, it is also visually advantageous for the viewer to allow variable rational angle Tvar to increase, in each case, linearly or logarithmically whit the sequence of the forming layers. This increases the impression of the layering in the three-dimensional rotational image.

Referring to two-dimensional image 400 of FIG. 4A as an example there are two layers, and so polygons 401 and 403 in first layer 610, which is chosen as the reference layer, are given a rotational angle Tmin, while polygons 402 and 404 in second layer have a rational angle of (Tmin+Tvar__2), which, in this case, is also (Tmin+Tvar__max__n). FIG. 4B is the three-dimensional rotational image generated by the computer program in step 503. FIG. 4D is a top view of the three-dimensional rotational image of FIG. 4B that shows the various rational angle dimensions more clearly.

One advantage of above-described process 500 is that the number of layers in the three-dimensional rotational image is as small as possible. If the above-described process 500 is utilized, but the inherent depth information in the two-dimensional image is not utilized, four layers are necessary if each polygon in FIG. 4A is assigned to a separated layer. Since, however, polygons 402 and 494 do not overlap one another, polygons 402 and 404 can be assigned to the same layer without impairing the impression of depth for the viewer in the three-dimensional rotational image. The above-described process 500 thus accumulates the two-dimensional depth sorting with the "real" two-dimensional overlapping of the individual polygons.

FIG. 4B illustrates a sample result of an application of process 500 to the group of objects shown in FIG. 4A. The computer rotates polygons 401 and 403 in the rearmost layer by the angle Tmin to form rotational bodies 401' and 403', respectively, and rotates the polygons 402 and 404 of the layer located more in front along an additional angle Tvar so that they "stick out" in the three-dimensional rotational image as objects 402' and 404', respectively. Accordingly, the user receives an impression of the layering of the original two-dimensional image even after the three-dimensional rotational image has been generated.

FIG. 4D show a top view of the resulting three-dimensional rotational image. In the example illustrated in FIGS. 4B and 4D, the additional rotational angle Tvar around which the polygons located more in front are rotated is distributed symmetrically between the left-hand and the right-hand front area of the rotational body, as can be seen clearly from FIG. 4D. Accordingly, each of the front planes of the resulting open rotational body preserves the impression of the depth information as contained in the original two-dimensional image.

As is illustrated by the result shown in FIGS. 4B and 4D can be generated by rotating the initial two-dimensional image around a rotational axis by Tmin/2 clockwise and additionally by Tmin/2 counterclockwise, and furthermore by rotating the layers located more close to the user by (Tmin+Tvar)/2 clockwise and by (Tmin+Tvar)/2 counterclockwise, starting from the reference layer. This results in a symmetrical rotational image as shown in FIGS. 4B and 4D, if the resulting rotational body as a whole is then rotated such that the open front planes are looked upon by the user as in FIG. 4B.

One of skill in the art will appreciate that the above-described process 500 is advantageous for rotational angles Tmin other than 360° and for angles Tvar other than zero. If the computer program selects a rotational angle Tmin other than 360°, and if further Tmax is not equal to Tmin (in other words: Tvar does not equal zero), then the above-described process 500 provides an rotational representation which preserves the depth impression of the two-dimensional image.

Figure 4E:
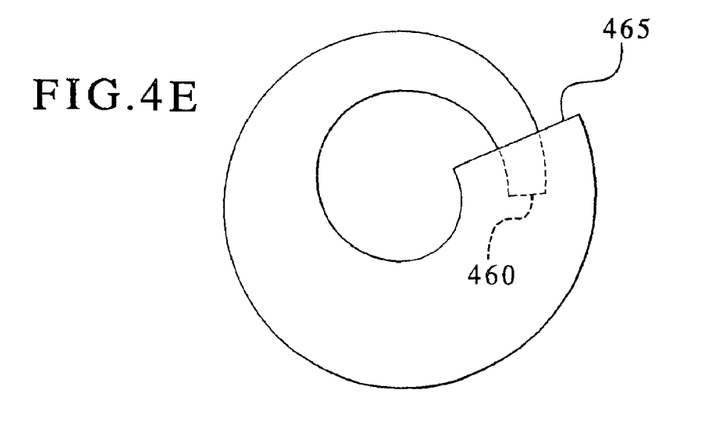
FIG. 4E depicts a top view of another three-dimensional rotational image, in accordance with methods, systems, and articles of manufacture consistent with the present invention.

The computer program may receive additional parameter selections from the user that define how to generate the three-dimensional rotational image. The parameters may, for example, include (in addition to parameters such as Tmin, Tmax, the rotational thickness Tthick, and the rotational thickness ratio) the location of the rotational axis. Also, the received parameters may include a scaling parameter that defines a ratio by which an area of a polygon is to be increased or decreased when rotating the polygon. This is illustrated in FIG. 4E. FIG. 4E shows a top view of a three-dimensional rotational image resulting from rotating a polygon 460 by a rotational angle larger than 360°, while the area of the polygon continually increases together with an increasing rotational angle. A surface 465 of the rotated polygon has an area larger than the initial polygon 460, as defined by a scaling factor. Using such a scaling factor leads to constellations where, even for rotational angles larger than 360°, open planes are viewable to the user. In such cases, it is then advantageous to have the polygons, which in the initial two-dimensional representation are located more in front, rotated by an additional angle Tvar.

Further, the resulting three-dimensional rotational image, as a whole, can be rotated, based on a received user selection, around any rotational axis.

Further, different sets of rotation angles (Tmin, Tmax) for clockwise rotation and for counterclockwise rotation can be received from the user as parameter selection. The resulting three-dimensional rotational image is the concatenation of the images which respectively result from the clockwise and the counterclockwise rotation of the initial two-dimensional image based on the inputted parameters. The resulting three-dimensional rotational image is not symmetrical with respect to the rotational axis.

Figure 4F:
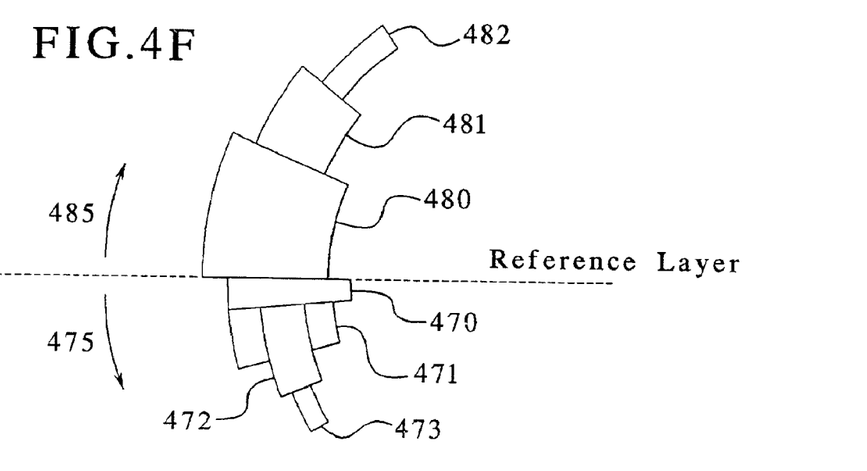
FIG. 4F depicts a top view of yet another three-dimensional rotational image, in accordance with methods, systems, and articles of manufacture consistent with the present invention.

Further, in step 501 of FIG. 5, the computer program can define a middle object by the reference layer, instead of the rearmost object. The computer program can then carry out rotation into different directions for the layers located in front and behind the reference layer, for example, with different sets of Tmin and Tmax, resulting in an image resembling a "telescopic" representation of the original two-dimensional representation. This is schematically illustrated in FIG. 4F, which depicts a top view of a three-dimensional rotational image. In FIG. 4F, objects 470, 471, 472, and 473 result from rotation of their corresponding two-dimensional images into a first direction indicated by arrow 475. Further, objects 480, 481, and 482 result from rotation of their corresponding two-dimensional objects into the opposite direction as indicated by arrow 485. As illustrated in FIG. 4F, Tmax is larger for the rotation direction indicated by arrow 485 compared to a smaller Tmax for the rotation direction indicated by arrow 475.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system for producing a three-dimensional rotational image from a two-dimensional image including a plurality of objects, the method comprising the steps of:

assigning each object to one of a plurality of sequential layers that correspond to visually depicted depths of the objects in the two-dimensional image;

rotating the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and displaying the three-dimensional rotational image.

2. The method of claim 1, wherein the objects are assigned to the layers so that within a given layer the object assigned to that layer neither overlaps with nor is included within another object in the given layer.

3. The method of claim 1, wherein the three-dimensional rotational image is symmetrical with respect to a plane in which the common rotational axis is located.

4. The method of claim 1, further comprising the step of:
when rotatively displaying the objects, modifying an area of each object by a predetermined scaling factor.

5. The method of claim 1, further comprising the step of:
prior to assigning the objects to the layers, ordering the objects in a sequence based on depths of the objects in the two-dimensional image.

6. The method of claim 5, wherein the objects are ordered so that the object having a greatest depth is first in the sequence.

7. The method of claim 5, wherein the objects are assigned to one of the plurality of sequential layers, beginning with a first object in the sequence.

8. A method in a data processing system for producing a three-dimensional rotational image from a two-dimensional image including a plurality of objects, the method comprising the steps of:

ordering the objects in a sequence based on depths of the objects in the two-dimensional image;

sequentially assigning each object in the sequence to one of a plurality of layers so that within a given layer an object assigned to that layer neither overlaps with another object in the given layer, nor is included within another object in the given layer;

rotating the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and displaying the three-dimensional rotational image.

9. A computer-readable medium containing instructions that cause a data processing system to perform a method for producing a three-dimensional rotational image from a two-dimensional image including a plurality of objects, the method comprising the steps of:

assigning each object to one of a plurality of sequential layers that correspond to visually depicted depths of the objects in the two-dimensional image;

rotating the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and displaying the three-dimensional rotational image.

10. The computer-readable medium of claim 9, wherein the objects are assigned to the layers so that within a given layer the object assigned to that layer neither overlaps with nor is included within another object in the given layer.

11. The computer-readable medium of claim 9, wherein the three-dimensional rotational image is symmetrical with respect to a plane in which the common rotational axis is located.

12. The computer-readable medium of claim 9, further comprising the step of:
when rotatively displaying the objects, modifying an area of each object by a predetermined scaling factor.

13. The computer-readable medium of claim 9, further comprising the step of:
prior to assigning the objects to the layers, ordering the objects in a sequence based on depths of the objects in the two-dimensional image.

14. The computer-readable medium of claim 13, wherein the objects are ordered so that the object having a greatest depth is first in the sequence.

15. The computer-readable medium of claim 13, wherein the objects are assigned to one of the plurality of sequential layers, beginning with a first object in the sequence.

16. A computer-readable medium containing instructions that cause a data processing system to perform a method for producing a three-dimensional rotational image from a two-dimensional image including a plurality of objects, the method comprising the steps of:
ordering the objects in a sequence based on depths of the objects in the two-dimensional image;
sequentially assigning each object in the sequence to one of a plurality of layers so that within a given layer an object assigned to that layer neither overlaps with another object in the given layer, nor is included within another object in the given layer;
rotating the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and
displaying the three-dimensional rotational image.

17. A data processing system for producing a three-dimensional rotational image from a two-dimensional image including a plurality of objects, the data processing system comprising:
a memory comprising a program that
assigns each object to one of a plurality of sequential layers that correspond to visually depicted depths of the objects in the two-dimensional image,
rotates the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and
displays the three-dimensional rotational image; and
a processing unit that runs the program.

18. The data processing system of claim 17, wherein the objects are assigned to the layers so that within a given layer the object assigned to that layer neither overlaps with nor is included within another object in the given layer.

19. The data processing system of claim 17, wherein the three-dimensional rotational image is symmetrical with respect to a plane in which the common rotational axis is located.

20. The data processing system of claim 17, further comprising the step of:
when rotatively displaying the objects, modifying an area of each object by a predetermined scaling factor.

21. The data processing system of claim 17, further comprising the step of:
prior to assigning the objects to the layers, ordering the objects in a sequence based on depths of the objects in the two-dimensional image.

22. The data processing system of claim 21, wherein the objects are ordered so that the object having a greatest depth is first in the sequence.

23. The data processing system of claim 21, wherein the objects are assigned to one of the plurality of sequential layers, beginning with a first object in the sequence.

24. A data processing system for producing a three-dimensional rotational image from a two-dimensional image including a plurality of objects, the data processing system comprising:
means for assigning each object to one of a plurality of sequential layers that correspond to visually depicted depths of the objects in the two-dimensional image;
means for rotating the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle; and
means for displaying the three-dimensional rotational image.

25. A computer-readable memory device encoded with a data structure with entries, each entry reflecting a layer associated with a visually depicted depth in a two-dimensional image including a plurality of objects, wherein a three-dimensional rotational image is produced from the two-dimensional image by a program which is encoded on the memory device and which is run by a processor in a system, each entry comprising:
a storage area in which is stored one of the plurality of objects assigned to the layer by the program, wherein the program rotates the objects of each layer around a common rotational axis, the common rotational axis being the common rotational axis for the plurality of layers, to form the three-dimensional rotational image having a maximum rotational angle around the common rotational axis with each object in a first of the layers having a minimum rotational angle and objects in layers other than the first layer having a rotational angle greater than the minimum rotational angle and less than or equal to the maximum rotational angle, and displays the three-dimensional rotational image.

* * * * *